(12) United States Patent
Cerami et al.

(10) Patent No.: US 6,876,731 B2
(45) Date of Patent: Apr. 5, 2005

(54) SYSTEM AND METHOD FOR MANAGING CDR INFORMATION

(75) Inventors: Robert E. Cerami, Birmingham, AL (US); John D. Ensminger, Homewood, AL (US); Douglas C. Van Natter, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 215 days.

(21) Appl. No.: 10/094,640

(22) Filed: Mar. 12, 2002

(65) Prior Publication Data
US 2003/0185363 A1 Oct. 2, 2003

(51) Int. Cl.[7] .............................................. H04M 15/00
(52) U.S. Cl. .................. 379/126; 379/121.05; 379/122; 379/112.01; 379/112.06; 379/133
(58) Field of Search ........................... 379/32.01, 32.05, 379/111, 112.01, 112.06, 114.01, 114.28, 115.01, 121.01, 121.05, 122, 126, 127.01, 133, 134, 137

(56) References Cited

U.S. PATENT DOCUMENTS

| | | |
|---|---|---|
| 5,146,491 A | 9/1992 | Silver et al. |
| 5,333,183 A | 7/1994 | Herbert ....................... 379/112 |
| 5,438,570 A | 8/1995 | Karras et al. .............. 370/94.2 |
| 5,517,555 A * | 5/1996 | Amadon et al. ............. 455/408 |
| 5,553,131 A | 9/1996 | Minervino, Jr. et al. |
| 5,579,371 A * | 11/1996 | Aridas et al. ............ 379/32.03 |
| 5,659,601 A | 8/1997 | Cheslog |
| 5,675,636 A | 10/1997 | Gray |
| 5,757,895 A | 5/1998 | Aridas et al. ................ 379/136 |
| 5,774,532 A | 6/1998 | Gottlieb et al. ................ 379/11 |
| 5,793,852 A | 8/1998 | Kang et al. |
| 5,809,507 A | 9/1998 | Cavanaugh, III ........... 707/103 |
| 5,915,006 A | 6/1999 | Jagadish et al. |
| 5,920,613 A | 7/1999 | Alcott et al. |
| 5,925,562 A | 7/1999 | Nova et al. .............. 435/287.1 |
| 5,930,343 A | 7/1999 | Vasquez |
| 5,963,625 A | 10/1999 | Kawecki et al. |
| 5,987,107 A | 11/1999 | Brown |
| 5,987,108 A | 11/1999 | Jagadish et al. |
| 5,991,376 A | 11/1999 | Hennessy et al. |
| 5,999,604 A * | 12/1999 | Walter ......................... 379/133 |
| 6,016,547 A | 1/2000 | Ono ............................ 713/300 |
| 6,028,914 A * | 2/2000 | Lin et al. ....................... 379/14 |
| 6,038,555 A | 3/2000 | Field et al. .................... 706/21 |
| 6,052,447 A | 4/2000 | Golden et al. |
| 6,052,449 A | 4/2000 | Chavez, Jr. |
| 6,064,881 A | 5/2000 | Shea et al. ................... 455/427 |
| 6,122,352 A | 9/2000 | Kangas et al. |
| 6,125,173 A | 9/2000 | Jagadish et al. |
| 6,145,005 A | 11/2000 | Kirkby |

(Continued)

OTHER PUBLICATIONS

U.S. Appl. No. 10/094,614, filed Mar. 12, 2002, entitled "System and Method for Ensuring Proper Billing in a Cellular Telephone System", Inventors: Cerami et al.

(Continued)

*Primary Examiner*—Quoc Tran
(74) *Attorney, Agent, or Firm*—Merchant & Gould

(57) ABSTRACT

A call detail record (CDR) management tool is used to calculate statistics using data in one or more CDRs, view data in one or more CDRs and extract one or more CDRs. The CDRs are generated by a switch and stored in a raw binary format. The raw CDRs are converted from a raw format to a generic format to facilitate the management tool's operations. Statistics include any statistic that can be calculated from telephone call data stored in the CDRs. The viewer allows viewing and storage of one or more fields of CDR data. The extraction tool can store extracted CDRs in raw format or generic format.

7 Claims, 16 Drawing Sheets

U.S. PATENT DOCUMENTS

| | | |
|---|---|---|
| 6,223,035 B1 | 4/2001 | Pierce et al. ................. 455/433 |
| 6,224,477 B1 | 5/2001 | Ho et al. .................... 455/433 |
| 6,249,570 B1 | 6/2001 | Glowny et al. ........... 379/88.22 |
| 6,249,572 B1 * | 6/2001 | Brockman et al. .......... 379/133 |
| 6,282,267 B1 * | 8/2001 | Nolting ................... 379/32.03 |
| 6,298,125 B1 | 10/2001 | Goldberg et al. |
| 6,301,471 B1 | 10/2001 | Dahm et al. |
| 6,337,901 B1 | 1/2002 | Rome et al. |
| 6,385,444 B1 * | 5/2002 | Peschel et al. ............... 455/405 |
| 6,522,734 B1 | 2/2003 | Allen et al. ............ 379/114.29 |
| 6,658,099 B2 | 12/2003 | Perkins, III ............ 379/112.01 |
| 2002/0176378 A1 | 11/2002 | Hamilton et al. ........... 370/328 |
| 2002/0191597 A1 | 12/2002 | Lundstrom .................. 370/356 |
| 2004/0133487 A1 | 7/2004 | Hanagan et al. .............. 705/34 |

OTHER PUBLICATIONS

U.S. Appl. No. 10/094,641, filed Mar. 12, 2002, entitled "System and Method for Verifying Subscriber Data Records in a Telephone System", Inventors: Cerami et al.

U.S. Appl. No. 10/094,642, filed Mar. 12, 2002, entitled "System and Method for Generating Computer Code to Facilitate Development of CDR Management", Inventors: Cerami et al.

U.S. Official Action dated Sep. 24, 2004 in U.S. Appl. No. 10/094,641.

* cited by examiner

CALL ACTIVITY REPORT 201

| DESCRIPTION | NUMBER | PERCENT OF TOTAL | AVERAGE DURATION(S) | RAW DURATION(S) | ADJUSTED DURATION(S) |
|---|---|---|---|---|---|
| Prepaid-Originated Calls | 1,000 | 23.81% | 54 | 54,000 | 59,826 |
| Post Paid-Originated Calls | 3,000 | 71.43% | 73 | 219,000 | 226,483 |
| Test number-Originated Calls | 0 | 0 | 0 | 0 | 0 |
| Calls with blank a-numbers | 200 | 4.76% | 23 | 4,600 | 4,721 |
| TOTAL | 4,200 | | 66.10 | 277,600 | 291,030 |

Longest Call - 28,800 seconds (4:00:00)
Caller (blank) called 15552314876 (08/02/01 06:44:20 to 08/02/01 10:44:20)
Dialed 15552314876
Call Type: CR Call Direction land to land
File: c:\tapes\switch102\tape102.sta NUMBER OF CALLS OVER 7200 SECONDS: 5 (duration of these calls: 81,000)

NUMBER OF UNANSWERED CALLS OVER 360 SECONDS: 100 (duration of these calls: 170,000)

CALL DIRECTION SUMMARY 204

| TYPE | NUMBER | PERCENT OF TOTAL | MAX DURATION | DESCRIPTION |
|---|---|---|---|---|
| 0 | 3,000 | 21.90% | 10,000 | LAND-TO-MOBILE |
| 1 | 5,000 | 36.50% | 12,000 | MOBILE-TO-LAND |
| 2 | 500 | 3.65% | 3,000 | MOBILE-TO-MOBILE |
| 3 | 1,500 | 10.95% | 0 | MOBILE-ORIGINATED |
| 4 | 1,200 | 8.75% | 0 | LAND-ORIGINATED |
| 5 | 2,500 | 18.25% | 40,000 | LAND-TO-LAND |
|  | 13,700 |  | 65,000 | TOTAL |

FIG. 2B

CALL FINAL CLASS SUMMARY 206

| CODE | NUMBER | PERCENT OF TOTAL | TOTAL DURATION | DESCRIPTION |
|---|---|---|---|---|
| 01 | 10,000 | 94.56% | 30,000 | NORMAL |
| 02 | 500 | 4.73% | 2,500 | ANSWER NO CHARGE |
| 03 | 75 | 0.71% | 1,500 | NORMAL - ROAMER OR FOREIGN |
| | 10,575 | | 34,000 | TOTAL |

FIG. 2C

RECORD TYPE SUMMARY 208

| TYPE | NUMBER | DURATION | PERCENT OF TOTAL | DESCRIPTION |
|---|---|---|---|---|
| 0 | 3,000 | 100,000 | 66.67% | CR (Call Record) |
| 1 | 1,200 | 45,000 | 26.67% | ISH (Inter-Switch Handoff) |
| 2 | 0 | 0 | 0% | AUR (Abbreviated Usage Record) |
| 3 | 300 | 8,700 | 6.66% | MSA (Mobile Service Area) |
|  | 4,500 | 153,700 |  | TOTAL |

COUNTS BY DATE:

| DATE | CR | ISH | MSA | TOTAL |
|---|---|---|---|---|
| 8/01 | 10,000 | 6,000 | 800 | 16,800 |
| 8/02 | 15,000 | 3,000 | 300 | 18,300 |
| 8/02 | 12,000 | 2,000 | 100 | 14,100 |
| ••• | ••• | ••• | ••• | ••• |

DURATION BY DATE:

| DATE | CR | ISH | MSA | TOTAL |
|---|---|---|---|---|
| 8/01 | 300,000 | 180,000 | 2,400 | 482,400 |
| 8/02 | 475,000 | 65,000 | 900 | 540,900 |
| 8/02 | 375,000 | 58,200 | 400 | 433,600 |
| ••• | ••• | ••• | ••• | ••• |

FIG. 2D

| GAP ANALYSIS 210 | | |
|---|---|---|
| FROM | TO | GAP DURATION |
| 08/01/01/ 03:30:20.0 | 08/01/01 03:35:20.0 | 300 |

FIG. 2E

BUSIEST-MINUTES 212

| DATE | TIME | NUMBER |
|---|---|---|
| 8/21/01 | 20:10 | 1005 |
| 8/21/01 | 20:11 | 1003 |
| 8/21/01 | 20:14 | 1001 |
| 8/30/01 | 19:22 | 993 |
| 8/30/01 | 19:28 | 990 |
| 8/30/01 | 19:33 | 985 |

FIG. 2F

MOST-POPULAR-SHORT-CALLED-NUMBERS 214

| NUMBER | COUNT | TOTAL DURATION | AVERAGE DURATION | MIN DURATION | MAX DURATION |
|---|---|---|---|---|---|
| *2844 | 1,000 | 32,000 | 32 | 0 | 152 |
| *393 | 200 | 20,000 | 100 | 0 | 321 |
| *621 | 70 | 2,800 | 40 | 0 | 205 |

FIG. 2G

TRUNK USAGE 216

| TRUNK GROUP | INCOMING COUNT | INCOMING DURATION W/O SEIZURE | INCOMING DURATION W/ SEIZURE | AVG. SEIZURE | OUTGOING COUNT | OUTGOING DURATION W/O SEIZURE | OUTGOING DURATION W/ SEIZURE | AVG. SEIZURE |
|---|---|---|---|---|---|---|---|---|
| 0001 | | | | | 1 | 1 | 47 | 46 |
| 0002 | | | | | 1 | 22 | 20 | -2 |
| 0003 | 1,000 | 4,000 | 16,000 | 12 | | | | |
| 0004 | 2,000 | 24,000 | 60,000 | 17 | | | | |
| 0005 | | | | | 6,000 | 10,000 | 100,000 | 15 |
| 0006 | | | | | 8,000 | 64,000 | 200,000 | 17 |

FIG. 2H

CELL USAGE 218

| CELL SITE | INCOMING COUNT | INCOMING DURATION W/O SEIZURE | INCOMING DURATION W/ SEIZURE | AVG. SEIZURE | OUTGOING COUNT | OUTGOING DURATION W/O SEIZURE | OUTGOING DURATION W/ SEIZURE | AVG. SEIZURE |
|---|---|---|---|---|---|---|---|---|
| 0001 | | | | | 1,000 | 70,000 | 8,000 | 10 |
| 0002 | | | | | 2,000 | 82,000 | 100,000 | 9 |
| 0003 | | | | | 3,000 | 40,000 | 70,000 | 10 |
| 0004 | 500 | 1,500 | 10,000 | 17 | 3,000 | 73,000 | 100,000 | 9 |
| 0005 | 2,000 | 36,000 | 68,000 | 16 | 1,000 | 19,000 | 27,000 | 8 |
| 0006 | 1,000 | 15,000 | 30,000 | 15 | 2,000 | 219,000 | 67,000 | 9 |

FIG. 21

CDR VIEW 301

TITLE BAR 302

| CFC | CALL DIRECTION | START DATE/TIME | CALLING NUMBER | ORIGINATING MOBILE | DIALED DIGITS | CALL DURATION |
|---|---|---|---|---|---|---|
| 47 | L-L | 08/02/01 15:20:02 | | 15553824736 | 15553721411 | 2000 |
| 01 | M-M | 08/02/01 15:21:04 | 15552314384 | | *6321 | 100 |
| 3A | M-L | 08/03/01 15:22:06 | 15553214873 | | 15553374111 | 624 |
| 47 | L-M | 08/04/01 02:30:54 | | 15553827221 | 15553328414 | 122 |
| 01 | L-L | 08/04/01 04:26:52 | | 15552248241 | *4111 | 203 |
| 01 | M-M | 08/04/01 10:28:37 | 15553211341 | | 15551234567 | 356 |
| 01 | L-X | 08/05/01 22:20:33 | 15556789101 | | 15557654321 | 897 |

DATA 304

FIG. 3

```
struct Generic_CDR {
        type 1  generic_CDR_field 1;
        type 2  generic_CDR_field 2;
        type 3  generic_CDR_field 3;
        type 4  generic_CDR_field 4;
        type 5  generic_CDR_field 5;

# ifdef SWITCH 1
        type 6  generic_CDR_field 6;
        type 7  generic_CDR_field 7;

# elif defined (SWITCH 2)
        type 8  generic_CDR_field 8;

#endif
}
```

FIG. 6

SYSTEM AND METHOD FOR MANAGING CDR INFORMATION

BACKGROUND

1. Field of the Invention

The present invention relates generally to the field of telephone switching equipment. More specifically, the present invention relates to the management of call detail records in telephone switching equipment.

2. Background of the Invention

A continuing problem faced by cellular telephone companies is monitoring activity on their cellular telephone networks. A significant contribution to this problem stems from the disparate kinds of equipment used in the network. One consequence of the inability to effectively monitor activity in the system is that unbilled activity can occur on the network. This can happen for a number of reasons, including stolen service through a variety of cellular fraud schemes, billing mistakes due to incorrect entry of billing information, manufacturer errors in configuring telephone switches that lead to missed billing opportunities, errors in switch operating systems and poor management that results in improper billing for used services.

Detecting such lost billing opportunities requires analysis of the activity of each switch in the telephone network. Modern cellular telephone switches maintain records for each telephone call the switch is involved in handling. These records are known as call detail records (CDRs). CDRs contain virtually all the information regarding telephone calls handled by the switch, including, for example, identification of trunk group and cell site, duration of the call, start date and start time of the call, termination status of the call and other information related to the call. An enormous amount of information can be stored in the CDRs. For example, in a typical billing cycle of one month it is not uncommon for a switch in a cellular telephone system to generate fifty to one hundred million CDRs.

Extracting this information in a usable form is a significant problem for most cellular telephone systems. One problem is that cellular telephone systems generally are not homogenous systems. That is, many cellular telephone systems comprise switches from more than one manufacturer. While each switch provides CDRs containing detailed information regarding the calls handled by that switch, the CDRs are generated in a format that is proprietary to its manufacturer. For example, some switches generate one CDR per telephone call, while other switches generate one or more CDRs per telephone call. These proprietary formats make it enormously difficult to amass the voluminous CDR information from multiple switches so that call detail analyses can be performed on a system-wide basis, rather than switch-specific basis. Further, CDRs can differ even in a single switch manufacturer's switches. Such differences can result, for example, from different releases of switch software.

SUMMARY OF THE INVENTION

The present invention provides management tools that allow users to monitor telephone call activity on one or more cellular telephone switches in a cellular telephone system, regardless of switch type. A generic CDR structure is created that can store call data for any CDR generated by a particular switch type in the cellular telephone network. The generic CDR includes a field corresponding to every field that is found in any CDR generated by the particular switch type.

In one embodiment, the present invention is a method for managing CDRs. The method includes the step of reading raw CDRs, the step of converting the raw CDRs into generic CDRs, and the step of determining whether to view or extract CDRs, or to calculate statistics based on the CDRs. If the CDRs are to be viewed, the method includes the step of displaying one or more fields of CDR data in a view display window. If the CDRs are to be extracted, the method includes the steps of extracting CDRs based on extraction criteria and storing the extracted CDRs in an extracted CDR file. If the statistics are to be calculated, the method includes the steps of calculating and reporting the statistics.

In another embodiment, the present invention is a system for managing CDRs. The system includes a CDR processor configured to receive raw CDRs and a CDR converter to convert raw CDRs to generic CDRs. Optionally, this embodiment includes a CDR management tool. The CDR management tool includes at least one of a statistics tool to calculate statistics based on the CDRs, a viewer tool to display one or more fields of CDR data and an extraction tool to extract one or more CDRs based on extraction criteria.

BRIEF DESCRIPTION OF THE DRAWINGS

FIG. 2A is an exemplary summary call activity report according to an embodiment of the present invention.

FIG. 2B is an exemplary call direction summary report according to an embodiment of the present invention.

FIG. 2C is an exemplary call final class summary report according to an embodiment of the present invention.

FIG. 2D is an exemplary record type summary according to an embodiment of the present invention.

FIG. 2E is an exemplary gap analysis report according to an embodiment of the present invention.

FIG. 2F is an exemplary busiest-minutes report according to an embodiment of the present invention.

FIG. 2G is an exemplary most-popular-short-called-numbers report according to an embodiment of the present invention.

FIG. 2H is an exemplary trunk usage report according to an embodiment of the present invention.

FIG. 2I is an exemplary cell usage report according to an embodiment of the present invention.

FIG. 3 is an exemplary CDR view display output by a viewer tool according to an embodiment of the present invention.

FIG. 6 is an exemplary generic CDR according to an embodiment of the present invention.

DETAILED DESCRIPTION OF THE INVENTION

Figure 1:
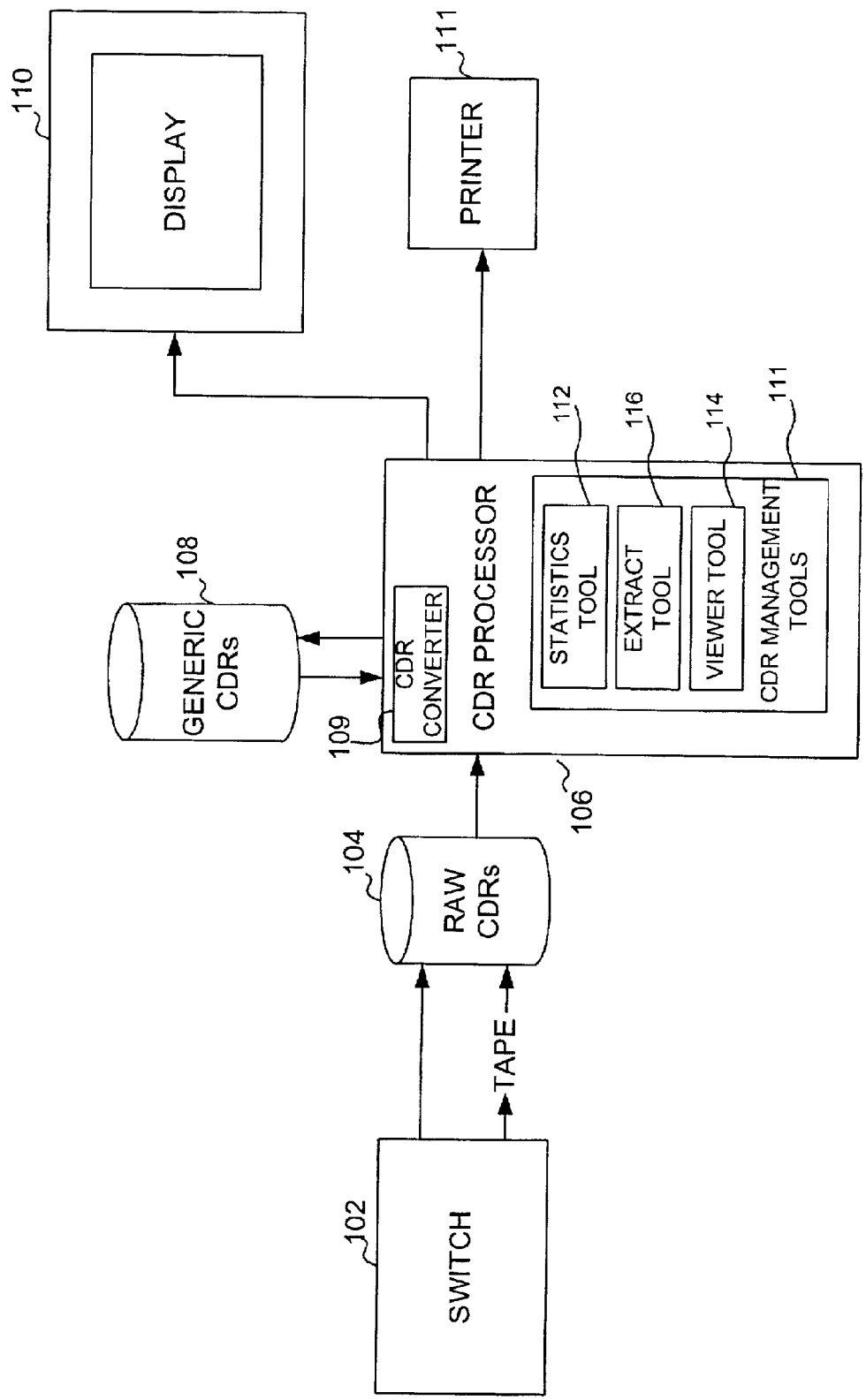
FIG. 1 is a schematic diagram of a system for managing CDR information according to an embodiment of the present invention.

FIG. 1 is a schematic diagram of a system for managing CDR information according to a preferred embodiment of the present invention. A switch 102 generates at least one call detail record (CDR) for each telephone call it is involved in processing. Switch 102 can be any switch capable of generating CDRs. Such switches are well-known to those skilled in the art, and include cellular telephone switches manufactured by Lucent, Nortel, Ericsson and others.

Typically CDRs generated by switches manufactured by different manufacturers have different structures. Further, while some switch manufacturers provide switches that use the same CDR structure for every telephone call handled by the switch, other switch manufacturers provide switches that generate CDRs having different structures based on the type of telephone call. For example, different CDR structures may be used for telephone calls originating on land line telephones, telephone calls originating on cellular telephones, telephone calls terminating on land line telephones and telephone calls terminating on cellular telephones.

Each CDR comprises information about the telephone call to which it corresponds. Any switch-generated information regarding the telephone call can be stored in a CDR. For example, this information commonly includes information regarding the originator of the telephone call, including calling party number or a-number, and information regarding the called party, including dialed number, called number or b-number. In addition, this information generally includes the time the call was made, the duration of the call, the status of the call or termination code and any other desired information regarding a telephone call captured by the switch.

CDRs generated by switch 102 are stored on disk 104. Some switches generate tapes containing the CDRs for a billing period. According to the present invention, such CDRs are stored from a tape to disk 104. The CDRs are stored in a raw format. The raw format is generally a binary format that is typically proprietary to each switch manufacturer. CDRs stored on database 104 are generally referred to as raw CDRs.

A CDR processor 106 is electronically coupled to disk 104 such that CDR processor 106 has access to the raw CDRs stored on disk 104. A CDR converter 109 converts raw CDRs retrieved from raw CDR disk 104 into generic CDRs that can then be processed by the other tools.

Generic CDRs facilitate the management processes of the present invention. According to an embodiment of the present invention, a generic CDR is a data structure that has a field corresponding to every field that can be present in any CDR produced by a switch of any one manufacturer. In an alternative embodiment of the present invention, the generic CDR is designed to provide a field corresponding to every field of CDR that can be generated by any switch of any manufacturer. Thus, a generic CDR structure can hold the data that is present in any one raw CDR from any switch manufacturer. During the conversion process, any field in the generic CDR that is not present in the raw CDR being converted is left blank or populated with a dummy value to indicate it is not a real value. The generic CDR structure is updated to reflect any changes in any CDR structure from any switch manufacturer.

An exemplary generic CDR structure is illustrated in FIG. 6. As shown in FIG. 6, the generic CDR is a data structure comprising a plurality of fields. As described above, each field corresponds to a field that can be present in a CDR generated by a target switch. The target switch is the switch whose CDRs the generic CDR is designed to capture. Each field in the generic CDR has an associated field type. The field type is the data type of the field with which it is associated. The generic CDR shown in FIG. 6 is for explanatory purposes only. In practice there would likely be many more fields and associated data types.

Exemplary fields include service code, service type, record length, record type, call type, called number, calling number, start time, end time and numerous other fields that would be known to those skilled in the art. Exemplary data types include byte, int, short, byteh, bytep and time_t. Byteh corresponds to hexadecimal data. Bytep corresponds to phone number data. Time_t corresponds to times. Other data types can be defined and/or used in the generic CDR if required.

As shown in FIG. 6, the compiler directive #ifdef can be used to configure the generic CDR for multiple switch types. Thus, the generic CDR can be configured for different switches produced by a particular manufacture that have common and uncommon fields. For example, all switches manufactured by Nokia generate CDRs that have common elements. In addition, different models of Nokia switches generate CDRs that can have uncommon elements. These differences can be accounted for by using the #ifdef compiler directive. As shown in FIG. 6, for example, fields 1–5 are common to both switch types 1 and 2. Fields 6–7 are specific to the CDRs generated by switch type 1 and field 8 is specific to switch type 2.

Using a generic CDR allows the management processes of the present invention to be written according to the generic CDR, rather than having to be individually tailored to each specific CDR type generated by a manufacturer's switch. Management of the CDRs is performed using management tools 111. According to one embodiment of the present invention, management tools 111 include a statistics tool 112, a viewer tool 114 and an extraction tool 116.

The information contained in the generic CDRs can be processed to determine a number of statistics related to the telephone calls handled by the various switches in the cellular telephone system. The statistics are performed by a statistics tool 112. The statistics can be calculated for all of the telephone calls for which there are CDRs, or for only a selected subset of these telephone calls.

For example, statistics can be generated regarding the types of telephone calls that are handled by a switch. Call types include prepaid calls, postpaid calls and unknown calls. Such statistics may include the total number of telephone calls by call type. The total number of calls is calculated by totaling the number of generic CDRs corresponding to each call type. Other statistics that may be generated include the duration of each telephone call, the average duration of telephone calls, and the status of telephone calls. For example, the status of the telephone calls can be the number and percentage of selected categories of telephone calls. Statistics tool 112 can also determine popular telephone numbers, i.e., which telephone numbers are called most often.

Another statistic is the CDR type. Some switches generate different types of CDRs. These different types are identified by a record type, also called a structure code. The statistics regarding record type include the number and percentage of record types and the number of records for a particular record type.

Statistics tool 112 can also perform a gap analysis. To perform a gap analysis, statistics tool 112 analyzes the generic CDRs to identify time frames of a selected duration that do not have any data. For example, in an embodiment of the present invention, statistic tool 112 identifies those time frames of two minutes of longer for which there is no data. A gap can indicate that not all of the data from the switch reached the billing system. Calls corresponding to data that does not reach the billing system are not billed and, consequently, represent a loss of revenue to the telephone company.

Statistics tool 112 can be invoked by a command on a command line. In an embodiment of the present invention, the information that is provided to statistic tool 112 includes a flag to activate or deactivate gap analysis and a flag to activate or deactivate a popular number report. Additionally, statistics tool 112 can generate statistics based on call trunks through which calls are routed, as well as calling patterns and statistics. In addition, statistics tool 112 is provided a parameter file (described below) that includes manufacturer specific parameters. One or more CDR filenames are also provided. The CDR filenames correspond to files in which the CDRs are stored. In addition, a switch name must be provided. The switch name can be used as the basis for a file name in which a report containing the calculated statistics is kept. The statistics can also be printed on a printer if desired.

FIGS. 2A–2I illustrate exemplary statistics that are calculated by statistics tool 112 and an exemplary reporting format for presenting the statistics. In FIG. 2A, an exemplary summary call activity report 201 is illustrated. Call activity report includes a call summary section 202. Call summary section 202 includes a table comprising various call types, the number of calls corresponding to those call types and their duration. The raw duration is the sum of the duration of each call of a particular call type as measured by the switch. The adjusted duration is the raw duration as it is adjusted to account for various business rules. These business rules include, for example, rounding up to the nearest minute and billing for ringing time. The business rules are implementation-dependent.

Call summary section 202 further includes longest call data. The longest call data includes the duration of the longest call, the telephone number of the calling party, the telephone number of the dialed party, the call type and in which file the record associated with the longest call is kept.

In addition, call summary section 202 can include the number of calls exceeding a specified duration. In the example shown in FIG. 2A, the duration of interest is 2 hours. Thus, the total duration of all calls exceeding two hours is determined and displayed. In addition, call summary section 202 can include data on the number of unanswered calls exceeding a specified duration. Unanswered calls may not be billable, but use up valuable switch time. Consequently, a large number of unanswered calls exceeding a specified duration indicates a waste of switch resources that may require further investigation. In the example shown in FIG. 2A, the duration of interest is 6 minutes. Thus, the total duration of all unanswered calls exceeding six minutes is determined and displayed.

FIG. 2B illustrates an exemplary summary of call direction statistics 204 that can be calculated and reported by statistics tool 112. The call direction statistics provide the number, percent of total, maximum duration and description for each of a pre-determined set of call direction types. In the table shown in FIG. 2B, the pre-determined set of call direction types includes land-to-mobile calls, mobile-to-land calls, mobile-to-mobile calls, mobile-originated calls, land-originated calls and land-to-land calls. Other calls directions for which statistics can be measured and reported would be known to those having skill in the art.

FIG. 2C illustrates an exemplary call final class (CFC) summary 206 that can be reported by statistics tool 112. The CFC is an indication of how the call was terminated. For example, did the call terminate normally, or was the call dropped by the system? The CFC summary is a tabular listing of CFC codes that provides statistics about each telephone call having a particular CFC code. For example, in the CFC summary illustrated in FIG. 2C, the statistics include the total number of calls for each CFC code, the percentage of the total number of calls for each CFC code, the total duration of calls for each CFC code and a description of the calls corresponding to each CFC code, as well as the totals for the columns. It would be apparent that statistics for more and/or different CFC codes can be reported by statistics tool 112.

FIG. 2D illustrates an exemplary record type summary 208 that can be reported by statistics tool 112. The record type summary is a tabular listing of record types that provides statistics about each telephone call having a particular record type. For example, in the record type summary illustrated in FIG. 2D, the statistics include the total number of calls for each record type, the percentage of the total number of calls of each record type, the total duration of calls of each record type and a description of the calls corresponding to each record type and totals for the columns. It would be apparent that statistics for more and/or different record types can be reported by statistics tool 112.

FIG. 2E illustrates a gap-analysis report 210 resulting from a gap analysis that can be performed by statistics tool 112. The gap analysis determines and reports any time period longer than a pre-determined amount of time for which there is no data. For example, suppose there is no data for Aug. 1, 2000, from 3:30 a.m. to 3:35 a.m. FIG. 2E shows an entry that can appear in a gap analysis table according to an embodiment of the present invention. As shown in the table in FIG. 2E, the gap analysis table indicates the date and time when the gap in data begins to the time it ends. The table also provides the gap duration in seconds. If no gaps are found in the data, the table contains a single entry, "No Gaps Found".

FIG. 2F illustrates a busiest-minutes report 212 that can be generated by statistics tool 112. A businest-minutes statistic is reported in busiest-minutes report 212. The busiest-minutes statistic indicates minutes during which the switch is the busiest. For example, statistics tool 112 determines overlaps in CDR times to determine when the switch is handling the largest number of calls at the same time. Statistic tool 112 can list the busiest N minutes as determined by the switch, where N is an integer. Preferably, the busiest-minutes statistic is reported in tabular form as shown in FIG. 2F. The table has headings for date, time and number of calls. The date and time indicate the minute that the number of calls corresponds to. In FIG. 2F, for example, N is chosen as 6. The data indicates that on Aug. 21, 2001, at approximately 8:15 p.m. the switch was handling about 1,000 calls, and on Aug. 30, 2001 at approximately 7:30 p.m., the switch was handling about 990 calls.

FIG. 2G illustrates a most-popular-short-called-numbers report 214 for reporting a most-popular-short-called-numbers statistic that can be determined and reported by statistics tool 112. The most-popular-short-called-numbers statistic measures the number of calls made to a number under M number of digits. For example, where M is 6, the most-popular-short-called numbers reports the top K calls made by dialing less than six digits. Both M and K are arbitrary, and are implementation dependent. In the example shown in FIG. 2G, M is chosen to be 6 and K is chosen to be 3. Consequently, the three most popular dialed numbers having less than 6 digits are reported. The report includes the number that was dialed, the number of times that number is dialed (count), the total duration of all calls made to that number, the average duration of calls made to that number and the minimum and maximum duration of any call made to that number.

FIG. 2H illustrates a trunk usage report 216 for a trunk usage statistic that is determined and reported by statistics tool 112. As shown in FIG. 2H, the trunk usage statistic provides incoming and outgoing call data for each of the trunk groups connected to the switch. The call data includes the number of incoming and outgoing calls for each trunk group, the duration of incoming and outgoing calls with and without seizure and the average seizure time for the incoming and outgoing calls. The seizure time refers to the ring time. The average seizure time is calculated as the duration with seizure minus the duration without seizure divided by the number of calls.

FIG. 2I illustrates a cell usage report 218 for a cell usage statistic that is determined and reported by statistics tool 112. As shown in FIG. 2H, the cell usage statistic provides incoming and outgoing call data for each of the cell sites connected to the switch. The call data includes the number of incoming and outgoing calls for each cell site, the duration of incoming and outgoing calls with and without seizure, and the average seizure time for the incoming and outgoing calls. The seizure time refers to the ring time. The average seizure time is calculated as the duration with seizure minus the duration without seizure divided by the number of calls.

As described above, some of the CDR management tools use a parameter file. The parameter file provides manufacturer-specific details regarding the data in the CDRs generated by a particular manufacturer's switch. Parameters include date parameters, billing parameters, miscellaneous parameters, phone number lists, numbering plan parameters, special numbers and special files data. Date parameters include start date and end date data, as well as leap year indicators. Billing parameters include free length, minimum length, roundup and maximum billing records data. Miscellaneous parameters include telephone company, wait and gap duration (preferably in seconds) parameters. Phone number lists identify files that contain telephone numbers to identify subscribers. For example, telephone number lists can include lists of prepaid subscribers, post pay subscribers and hybrid subscribers. Number plan parameters include telephone range for a given prefix, number of digits in telephone numbers and telephone number prefix data. Special number parameter data includes free numbers, free prefix numbers, temporary local directory numbers (TLDNs). Special file data indicate other files that contain parameter data. The use of such parameters would be well-known to those skilled in the art.

The information contained in one or more generic CDRs can be displayed on a computer display 110 or a printer 111 using a viewer tool 114. Whether displayed on computer display 110 or printer 111, the display of the information is controlled by a viewer tool 114. Preferably, viewer tool 114 operates on the raw CDRs 104.

Viewer tool 114 can be invoked in several ways. For example, viewer tool 114 can be invoked by double clicking a viewer tool button in a graphical user interface. In another alternative, viewer tool 114 is invoked by a command line. Preferably, the viewer tool is given one or more file names containing CDR data to be viewed when it is invoked. Alternatively, viewer tool 114 allows the user to select the file or files containing the CDR data to be viewed.

FIG. 3 is an exemplary CDR view 301 that is output by viewer tool 114. CDR view 301 contains a title bar 302 and a data section 304. Title bar 302 contains the names of the fields that have been selected for viewing. An exemplary selection of fields is shown in title bar 302. Selection of the fields for viewing is described below. Data section 304 shows the data in each CDR for the fields that have been selected. Preferably, not all of the CDRs are shown, but rather a selected subset of the CDRs is shown.

Figure 3A:
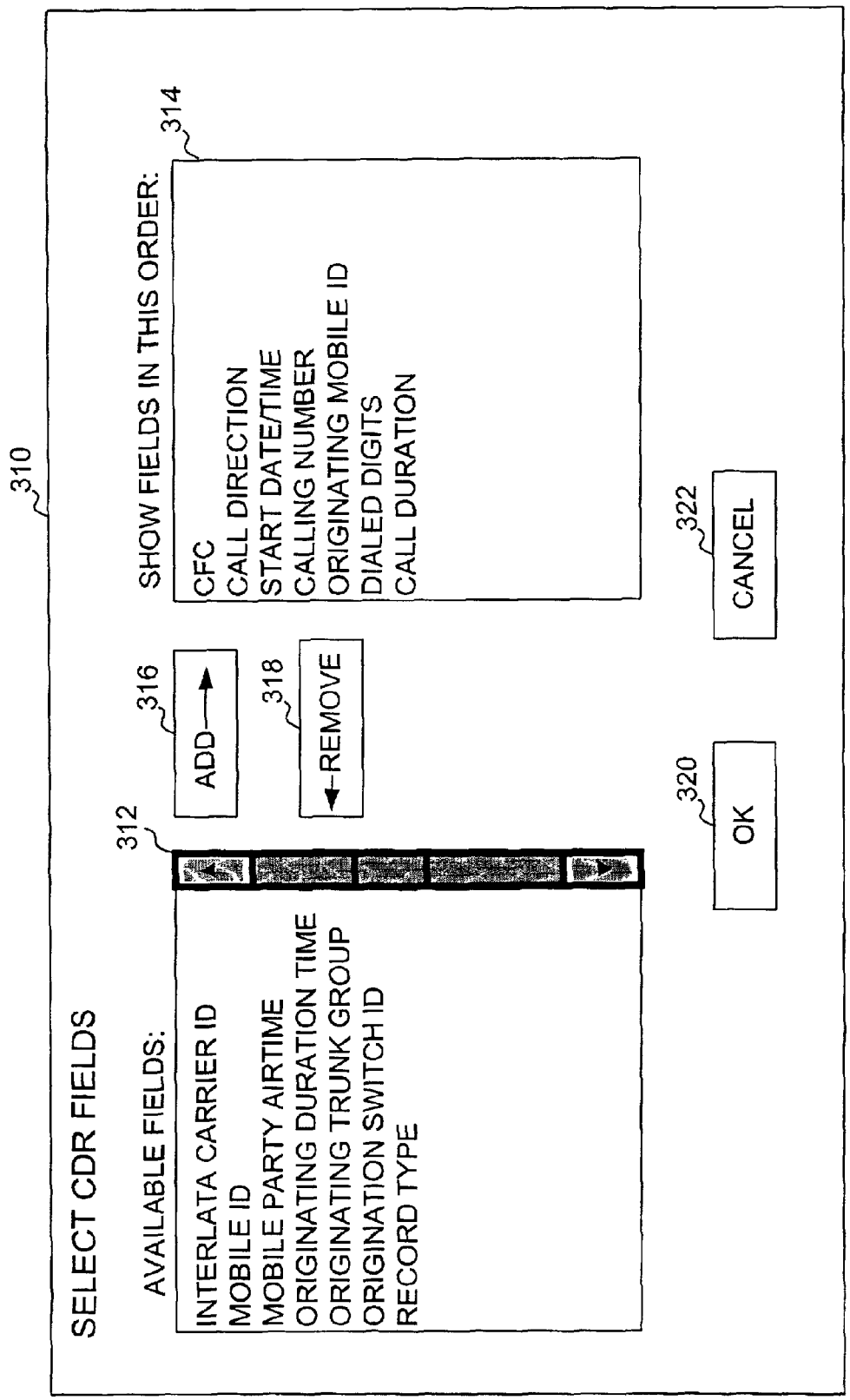
FIG. 3A is an exemplary field selection window according to an embodiment of the present invention.

FIG. 3A illustrates an exemplary GUI-based CDR selection window 310. Using selection window 310, a user can select any available CDR field or fields to be shown in CDR view 301. In addition, a user can specify the order in which to show the fields. To add new fields to be viewed, a user selects the desired field from a scrollable list of available fields 312 to highlight it. An exemplary list of available fields is shown in available fields list 312. Available list field 312 is for illustrative purposes and not intended to be exhaustive of possible available CDR fields. When the desired field is selected, the user clicks on an add button 316. Clicking on add button 316 adds the highlighted field to a display order list 314. In addition, in an embodiment of the present invention, the field name is removed from available field list 312 when the field is added to display order list 314.

Preferably, the order in which the selected fields appear in display order list 314 directly corresponds to the order that the fields are shown in title bar 302. The order can be changed within display order list 314 by clicking a field and using the up/down arrow buttons 323 to change the position of that field, or by dragging and dropping field names to the desired position in the title bar 302.

Fields can be removed from display order list 314. To remove a field from display order list 314, a user selects the field to be removed and clicks on a remove button 318. Clicking on remove button 318 deletes the field name from display order list 314. In an embodiment of the present invention, the removed field name is added to available field list 312 when it is removed from display order list 314.

To complete the viewer field selection, an OK button 320 is clicked on. Clicking on OK button 320 stores the selected fields and their order of appearance in title bar 302. If a user decides not to use the particular selection, the user can click cancel button 322. Clicking cancel button 322 returns the viewer to the state it was in prior to the present invocation of CDR selection window 322.

CDR management tools 111 also includes an extraction tool 116. Extraction tool 116 is used to extract CDRs meeting particular extraction criteria for display or further processing.

CDRs can be sorted according to the fields displayed in the view window. In addition, CDRs can be deleted and printed from the view window. A new CDR file can be created after the CDRs have been modified by sorting or deleting.

Figure 4:
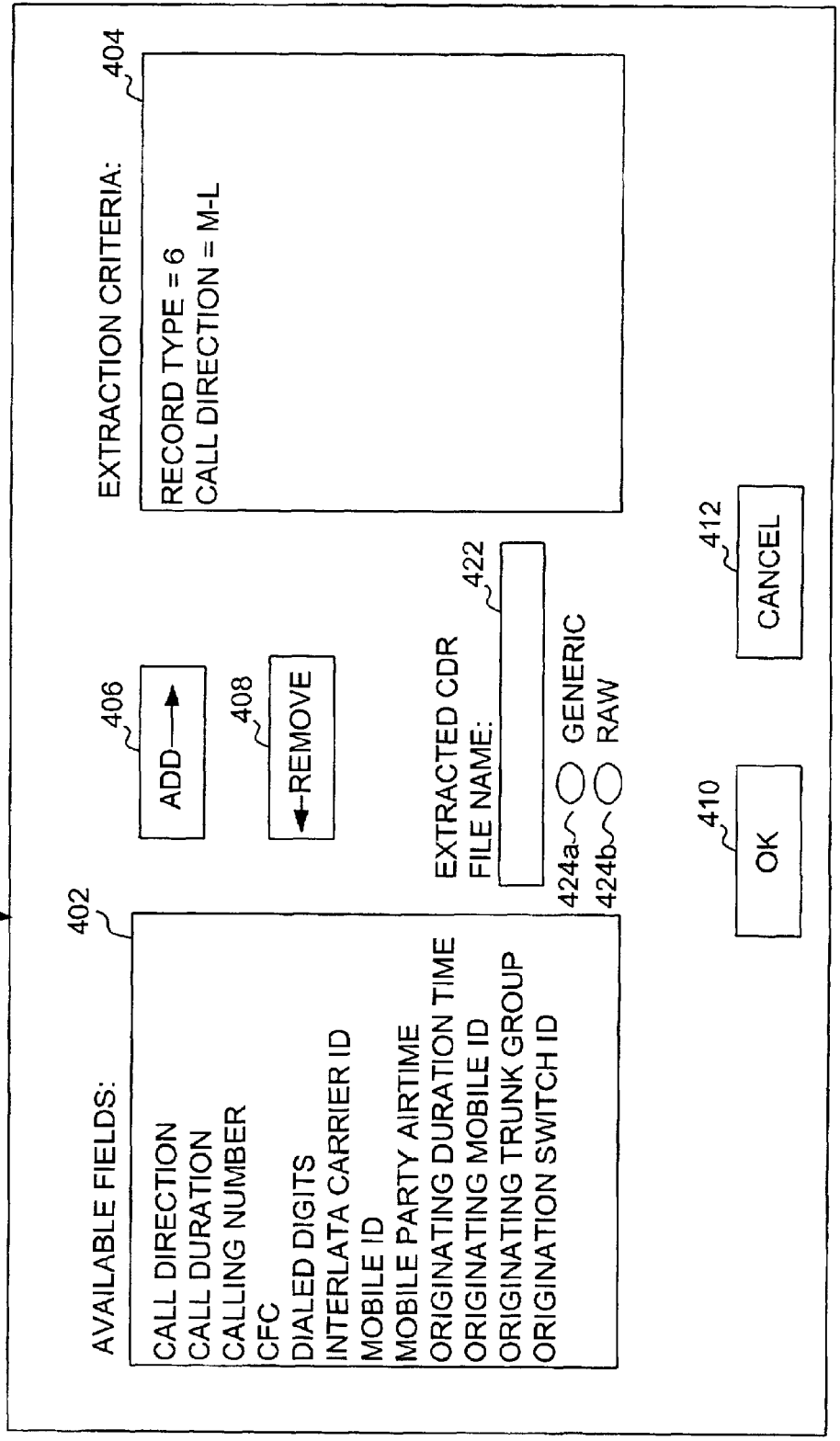
FIG. 4 is an exemplary extract window according to an embodiment of the present invention.
Figure 4A:
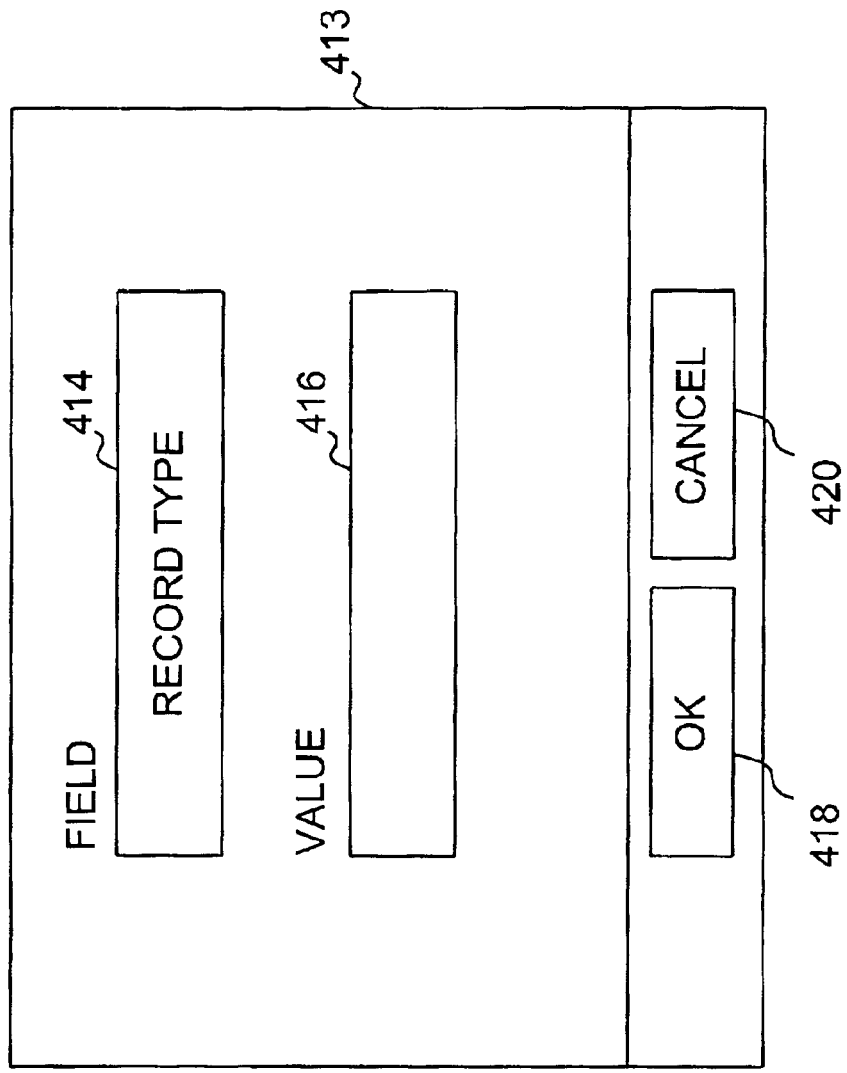
FIG. 4A is an exemplary extraction value pop-up window according to an embodiment of the present invention.

An extraction window 401 is shown in FIG. 4. Using extraction window 401, a user supplies field names and values. One or more fields are selected as extraction criteria. The selection can be made by using ADD button 406. When ADD button 406 is clicked on, an extraction value pop-up window is displayed. Extraction value window 413 displays the selected field in a field text box 414. A value for the selected field is entered in value text box 416. After the value is entered, an OK box 418 is clicked. This stores the value for the selected field. The field-value pair is then displayed in an extraction criteria box 404 in extraction window 404. In addition, the selected field is removed from the available fields box 402. A CANCEL button 420 allows the user to return to extraction window 401 without storing a value for the selected field.

Extraction criteria can be removed from extraction criteria box 404 by selecting the extraction criteria to be removed and clicking remove button 408. The removed criteria are removed from extraction criteria box 404. The fields associated with removed criteria are redisplayed in available fields box 402.

An extracted CDR file name is provided in text box 422. The extracted CDRs can be stored in generic format as determined by selecting one of radio buttons 424a and 424b.

After the extraction criteria and file name have been provided, OK button 412 is clicked to start the extraction process. Extraction tool 116 searches for all CDRs meeting the extraction criteria, extracts those CDRs and stores them in the provided extracted CDR file in either raw or generic format. Alternatively, CANCEL button 410 is clicked on at any time to cancel the extraction process.

All CDRs having the supplied values for the selected field names are identified and stored in an extracted CDR file for display or further processing. For example, statistics using statistics tool 112 can be calculated and displayed using the extracted CDR file. In addition, the extracted CDRs in the extracted CDR file can be viewed using viewer tool 114. Extract tool 116 can also reformat the extracted CDRs for input to other software such as Microsoft Excel or Microsoft Access.

In an alternative embodiment of the present invention, extraction tool 116 is invoked by a command line. The extraction criteria can be supplied in the command line or as an input file. The extracted CDRs are stored in an extracted CDR file specified on the command line. A format flag provides instruction as to whether to store the extracted CDRs in generic or raw format.

Figure 5:
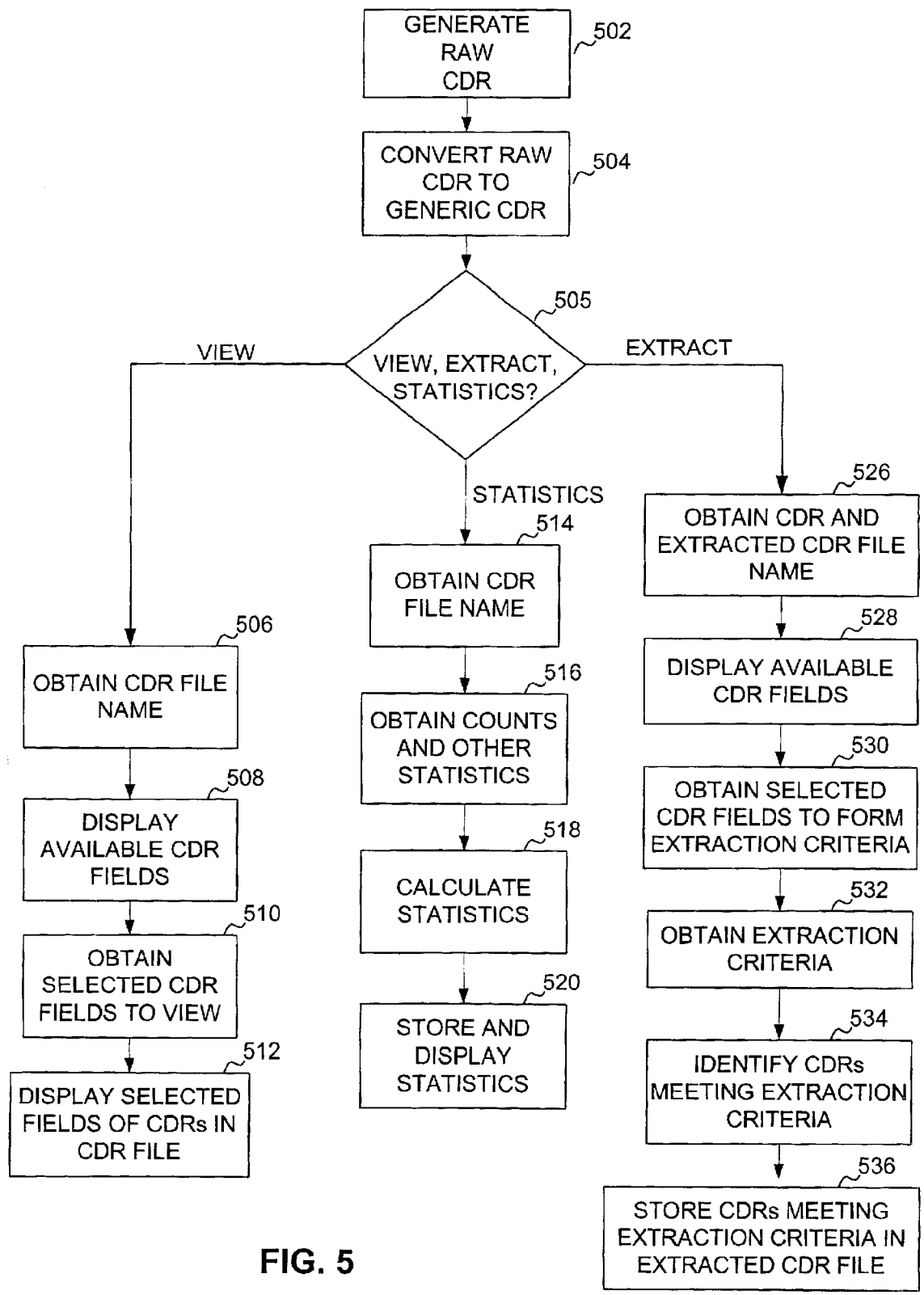
FIG. 5 is a flowchart of a method for managing CDRs according to an embodiment of the present invention.

A method for managing CDRs according to an embodiment of the present invention is illustrated by the flow chart shown in FIG. 5. In step 502, raw CDRs are obtained. The raw CDRs can be obtained from a switch or created by another process such as a file created by extraction tool 116. In step 505, it is determined whether to view or extract CDRs, or to calculate statistics on CDRs. The determination can be made by a user making the selection, or CDR processor 102 accepting a user's selection.

If the viewing of CDRs is chosen in step 505, the method continues in step 506 with the step of obtaining a CDR file name corresponding to the file in which the generic CDRs to be viewed are located. More than one file name can be chosen if the CDRs to be viewed are in multiple files. In step 508, the method determines and displays available fields. The determination can be made using a lookup table preconfigured based on switch type. In step 510, fields are selected for viewing. In step 512, the method displays the selected fields of the CDRs in the provided CDR file or files.

If the statistics calculation is chosen in step 505, the method continues in step 514, where the method obtains the name of the CDR file containing the CDRs for which statistics are to be calculated. More than one CDR file name can be given if the CDRs for which statistics are to be calculated are located in multiple files. In step 516, the method analyzes the CDRs to obtain running counts required for the statistic as well as other data required for the statistics. This other data includes data such as the call having the longest duration, which is determined by keeping an updating record of the call having the longest duration. In step 518, the method calculates statistics as described above. The statistics are stored and displayed as required in step 520.

If CDR extraction is chosen in step 505, the method continues in step 526. In step 526, the method obtains a CDR file name of a file containing CDRs to be extracted and an extracted CDR file name of a file to store the extracted CDRs. More than one CDR file name can be chosen if multiple files contain CDRs that are to be considered for extraction. In step 528, available fields are displayed. Fields to use as extraction criteria are selected in step 530. In step 532, extraction criteria values are obtained for each of the selected fields. Steps 530 and 532 can be performed in an iterative manner in which a field is selected in step 530 followed by entry of an extraction criteria value in step 532. Steps 530 and 532 are repeated in this manner until the extraction criteria have been entered. In step 534, the method searches through the provided CDR file or files to identify those CDRs meeting the selection criteria. The CDRs meeting the selection criteria are stored in a file corresponding to the extracted CDR file name in step 536.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for managing CDRs, comprising:
    a CDR processor configured to receive raw CDRs and convert the raw CDRs to generic CDRs, wherein each generic CDR comprises fields corresponding to every CDR field that can be generated by switches from any one manufacturer;
    a CDR management tool comprising one or more of a statistics tool to calculate statistics related to a plurality of the generic CDRs, a viewer tool to view at least one selected field of a plurality of the generic CDRs and an extraction tool to extract at least one of the generic CDRs meeting one or more extraction criteria;
    at least one CDR file, each CDR file comprising at least one generic CDR; and
    an extraction window comprising
        a first scrollable text box listing CDR fields from the at least one CDR file that are available for extraction and a second scrollable text box that lists extraction criteria selected for each CDR field selected in the first scrollable text box,
        an extracted CDR file name text box for entering a name of an extracted CDR file in which to store extracted CDRs, and a choice for selecting a new or generic storage format for the extracted CDRs being stored in the extracted CDR file, wherein the extraction tool identifies and extracts CDRs from the at least one generic CDR contained in the at least one CDR file that meet the extraction criteria shown in the second scrollable text box, and stores the extracted CDRs in the extracted CDR file.

2. A system for managing CDRs, comprising:

a CDR processor configured to receive raw CDRs and convert the raw CDRs to generic CDRs, wherein each generic CDR comprises fields corresponding to every CDR field that can be generated by switches from any one manufacturer;

a CDR management tool comprising one or more of a statistics tool to calculate statistics related to a plurality of the generic CDRs, a viewer tool to view at least one selected field of a plurality of the generic CDRs and an extraction tool to extract at least one of the generic CDRs meeting one or more extraction criteria;

at least one CDR file, each CDR file comprising a plurality of the generic CDRs;

a view window comprising at least a first scrollable text box that lists CDR fields contained in the at least one CDR file that are available for selection, and a second scrollable text box, that lists the names of CDR fields that have been selected for viewing; and a view window in which data from the selected CDR fields listed in the second scrollable text box is displayed.

3. The system recited in claim 2, wherein each CDR file comprises at least one generic CDR, and wherein the statistics tool calculates one or more statistics using information from the at least one generic CDR in the at least one CDR file.

4. The system recited in claim 2, wherein the statistics include a total number of telephone calls a switch handled for a given time period and a call direction statistic for each of the telephone calls that the switch handled for a given time period.

5. A system for managing CDRs, comprising:

a CDR processor configured to receive raw CDRs and convert the raw CDRs to generic CDRs, wherein each generic CDR comprises fields corresponding to every CDR field that can be generated by switches from any one manufacturer;

a CDR management tool comprising one or more of a statistics tool to calculate statistics related to a plurality of the generic CDRs, a viewer tool to view at least one selected field of a plurality of the generic CDRs and an extraction tool to extract at least one of the generic CDRs meeting one or more extraction criteria;

at least one CDR file, each CDR file comprising at least one generic CDR; and an extraction window comprising a first scrollable text box listing CDR fields from the at least one CDR file that are available for extraction and a second scrollable text box that lists extraction criteria selected for each CDR field selected in the first scrollable text box, an extracted CDR file name text box for entering a name of an extracted CDR file in which to store extracted CDRs, and wherein the extraction tool identifies and extracts CDRs from the at least one generic CDR contained in the at least one CDR file that meet the extraction criteria shown in the second scrollable text box, and stores the extracted CDRs in the extracted CDR file.

6. The system recited in claim 5, wherein each CDR file comprises at least one generic CDR, and wherein the statistics tool calculates one or more statistics using information from the at least one generic CDR in the at least one CDR file.

7. The system recited in claim 5, wherein the statistics include a total number of telephone calls a switch handled for a given time period and a call direction statistic for each of the telephone calls that the switch handled for a given time period.

* * * * *

UNITED STATES PATENT AND TRADEMARK OFFICE
CERTIFICATE OF CORRECTION

PATENT NO. : 6,876,731 B2
DATED : April 5, 2005
INVENTOR(S) : Cerami et al.

It is certified that error appears in the above-identified patent and that said Letters Patent is hereby corrected as shown below:

Column 5,
Line 1, "two minutes of longer" should read -- two minutes or longer --.

Column 6,
Line 40, "A businest-minutes" should read -- A busiest-minutes --.

Signed and Sealed this

Fourth Day of October, 2005

JON W. DUDAS
*Director of the United States Patent and Trademark Office*